United States Patent
Chung et al.

(10) Patent No.: US 6,271,884 B1
(45) Date of Patent: Aug. 7, 2001

(54) IMAGE FLICKER REDUCTION WITH FLUORESCENT LIGHTING

(75) Inventors: Randall M. Chung, Laguna Niguel; Magued M. Bishay, Costa Mesa; Joshua Ian Pine, Seal Beach, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/406,964

(22) Filed: Sep. 28, 1999

(51) Int. Cl.[7] .................................................. H04N 5/222
(52) U.S. Cl. ............................................ 348/370; 348/223
(58) Field of Search .................................... 348/207, 208, 348/220, 222, 223, 224, 225, 226, 229, 239, 370, 371; 358/518; H04N 9/73

(56) References Cited

U.S. PATENT DOCUMENTS

| | | | |
|---|---|---|---|
| 4,595,946 | * 6/1986 | Uehara et al. | 348/226 |
| 4,833,525 | * 5/1989 | Suzuki et al. | 348/226 |
| 5,053,871 | 10/1991 | Ogawa et al. | |
| 5,239,369 | * 8/1993 | Suzuki | 348/226 |
| 5,272,539 | 12/1993 | Kondo. | |
| 5,384,595 | * 1/1995 | Sakaguchi | 348/226 |
| 5,473,375 | 12/1995 | Takayama et al. | |

OTHER PUBLICATIONS

*The Gadget Guru Online!*, Canon Optura digital DV camcorder, Combines innovative technology with DV format; http://www.gadgetguru.com/PHDIG000021.HTML, dated Sep. 02, 1997.
*Conexant Data Sheet: CNO352: Digital CMOS Imager*; dated Apr. 16, 1999, Order No. 6001DSR1.
*Conexant Data Sheet: CNO352p: Pixel Processor and Control Chip*; dated Jun. 30, 1998, Order No. 6003DS.
*USB Camera Designer's Guide: Conexant Proprietary Information*; Document No. 6000DG, dated Jan. 29, 1999.
*ITU–T Recommendation H.324: Terminal for low bit–rate multimedia communication*, dated Feb. 1998.

* cited by examiner

*Primary Examiner*—Tuan Ho
(74) *Attorney, Agent, or Firm*—Akin, Gump, Strauss, Hauer & Feld, L.L.P.

(57) ABSTRACT

An imager reduces lighting induced flicker by setting its pixel integration time to an integral multiple of the periods between peak intensity of the lighting. In one implementation, flicker is reduced in a 30 Hz frame rate camera capturing an image lighted with 50 Hz lighting by setting the integration time to approximately 10 ms, the period between lighting intensity peaks.

23 Claims, 4 Drawing Sheets

IMAGE FLICKER REDUCTION WITH FLUORESCENT LIGHTING

BACKGROUND OF THE INVENTION

1. Field of the Invention

The invention pertains to digital imaging systems, and more particularly to a digital imaging system with reduced flicker caused by fluorescent lighting.

2. Description of the Related Art

Digital imagers have become commonplace in the last decade. For both video cameras and still cameras, semiconductor devices are commonly used to capture an image on a pixel-by-pixel basis and electronically process that image. Such devices as charge coupled devices (CCDs) and CMOS digital imagers have resulted in low cost video cameras, still cameras, and more recently cameras for coupling to computer systems for video conferencing and other image capture.

One problem pertaining to imaging systems generally and to digital imagers in particular is that of flicker. Flicker can arise from many sources, but in capturing digital video flicker especially results from a relationship between some periodic phenomena and the frame rate of the camera. Digital video cameras capture images on a frame-by-frame basis, typically at a predetermined frame rate. A common frame rate in the United States and in the computer industry is 30 Hz. But when such a frame rate is used in Europe, for example, flicker can result from fluorescent lighting systems employing the standard 50 Hz alternating current power. A 50 Hz lighting system yields periodic peaks of intensity at a rate of 100 Hz, or once every 10 milliseconds. Digital imaging systems often pick up "beats" associated with this 100 Hz intensity peak being captured at a 30 Hz rate. Beats can also arise from very slight differences in fundamental frequencies such as between 69.47 Hz video and 60 Hz lighting.

A number of solutions have been employed to eliminate these "beats." These include filtering systems that filter out beat frequency, phase locking systems that attempt to lock on to the 100 Hz intensity peaks and synchronize frame capture, and a variety of other techniques.

SUMMARY OF THE INVENTION

A digital imager implementing the techniques according to the invention reduces flicker by setting an integration time for each pixel of the imager to an integral multiple of the period of lighting intensity variations. Digital imagers typically have a parameter known as integration time, which is simply the amount of time the electronic component of the pixel is allowed to capture light energy for each frame. By adjusting the integration time, the intensity of the image can be adjusted, enhancing images and preventing saturation at high intensities. In essence integration time can act as an electronic "iris." By setting the integration time to be some integral multiple of an intensity period of a lighting source, however, flicker is reduced because the amount of light captured during an integration period is independent of where the integration period starts and ends relative to the variations in lighting intensity.

In one embodiment, an imager capturing video images at 30 frames a second (for a frame period of $33\frac{1}{3}$ milliseconds) employs an integration time that is a multiple of 10 milliseconds, the period of the peak intensities of 50 Hz lighting. Thus, the amount of light captured during each integration will be essentially the same irrespective of where in the 50 Hz fluorescent lighting cycle the integration period begins.

Further features of various embodiments of the invention include detecting the period of the peak intensity and setting the integration time accordingly, and altering the integration time as part of a system to set the overall gain of a video camera. Further, the techniques can be implemented in a variety of cameras, including a computer coupled universal serial bus camera or a stand alone video camera. In the computer coupled system, overall gain can be controlled with a software device driver.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
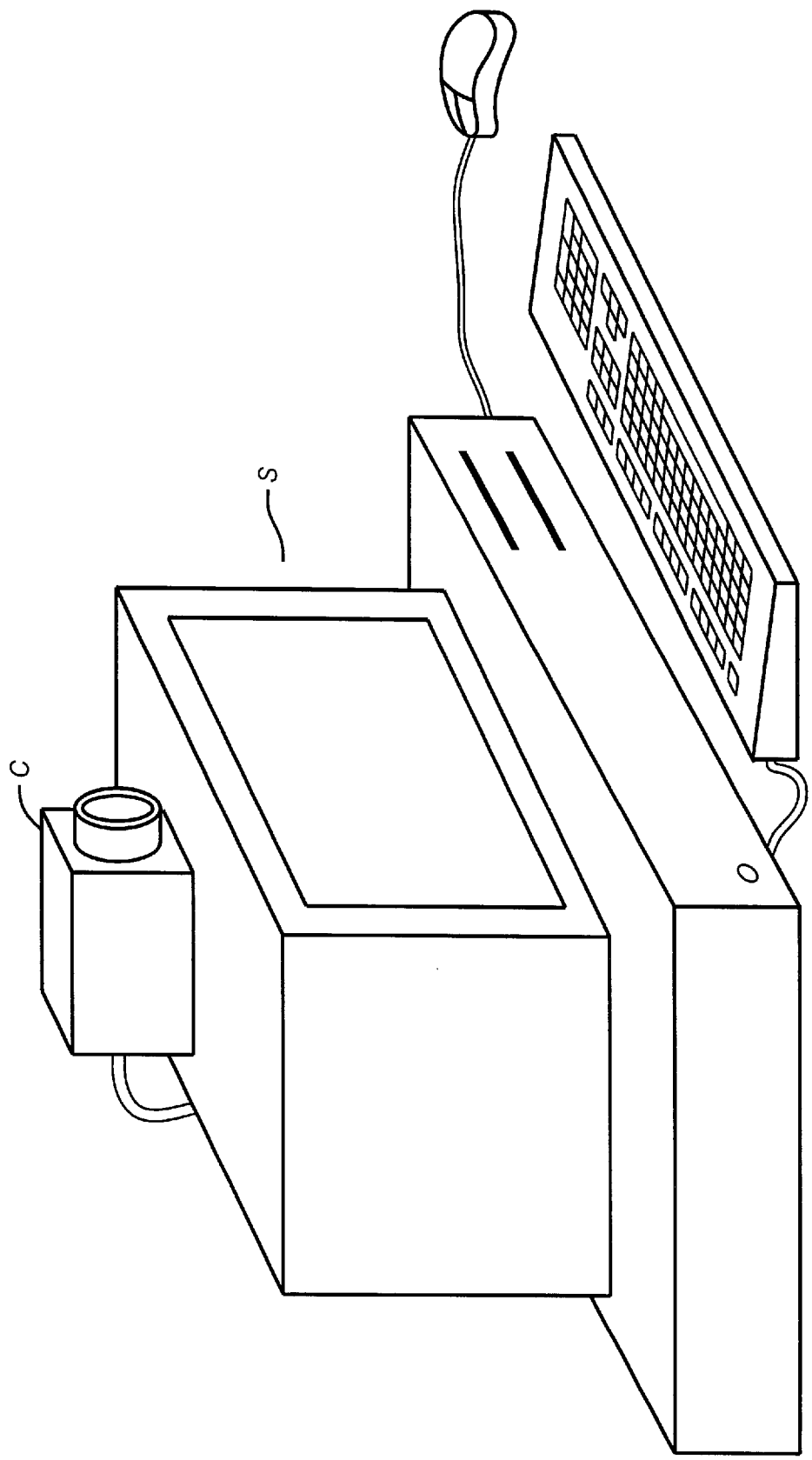
FIG. 1 is an illustration of a typical computer connected video camera implementing features according to the invention.

Turning to FIG. 1, illustrated is a typical digital video camera C coupled to a general purpose computer system S in which features of the invention are implemented. The video camera C is preferably coupled to a computer system S via a Universal Serial Bus (USB), and together this system employs flicker reduction according to the invention. The system illustrated in FIG. 1 preferably employs a device driver on the computer system S that controls the functions of the video camera C. Further details of this system are described below in conjunction with FIG. 4.

This system is particularly useful for videoconferencing, such as over the Internet. In particular, the video camera C preferably employs a 30 Hz image capture rate, which is compatible with the requirements of the ITU-T recommendation H.324 specification for terminals for low bit-rate multimedia communications. When a 30 Hz image capture rate is employed in the system of FIG. 1 in an environment in which 50 Hz fluorescent lighting is present, the video camera C is set to provide an integration time for each pixel of a multiple of 10 milliseconds. When the system of FIG. 1 is implemented in an environment having 60 Hz fluorescent lighting, the integration time is instead set to a multiple of $8\frac{1}{3}$ milliseconds. These integration times correspond to the period between peaks of intensity for 50 Hz and 60 Hz fluorescent lighting respectively. Using these integration times reduces the presence of "beats" in the captured image that would otherwise arise from the relationship between the 30 Hz frame rate and the 100 Hz or 120 Hz peak intensity rate of the lighting.

The system of FIG. 1 is simply an illustrative embodiment, however, and the flicker reduction techniques according to the invention can be employed in a variety of video imaging systems other than the system of FIG. 1.

Integration Time in a Video Imager

Digital imagers as would be used in the video camera C typically employ some technique to set each pixel's integration time, which is simply the amount of time that a pixel is allowed to gather light before that pixel is digitally read.

Figure 2:
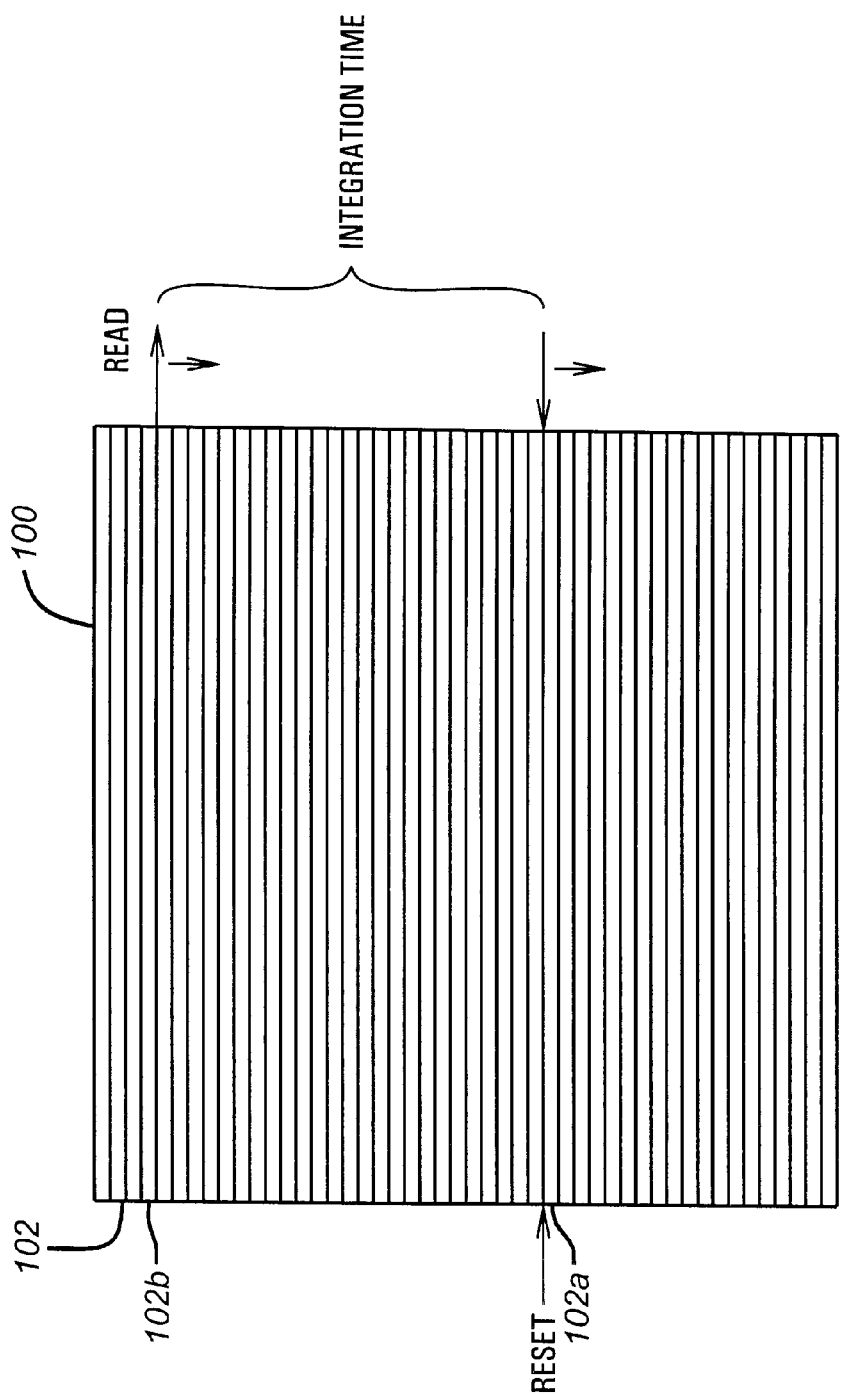
FIG. 2 is a diagram illustrating the concept of integration time employed by an electronic digital imager.

FIG. 2 is a diagram illustrating this concept of integration time in a video imager. Such an imager, can be, for example, a CN0352 Digital CMOS Imager by Conexant Systems, Inc. of Newport Beach, Calif. This imager provides among other things a 354×290 colorized pixel block, an on-chip 10 bit analog-to-digital converter, and an on-chip gain control. This device is typically implemented with the CN0352p Pixel Processor and Control Chip, also by Conexant Systems, Inc. This companion chip provides a variety of line-and pixel-level signal conditioning blocks as well as blocks to control the CMOS imager itself.

In FIG. 2, illustrated is a representation of an image array 100 with a number of rows of pixels 102. With the disclosed CN0352 imager discussed above, the image array 100 has an active pixel area of 354 rows by 290 columns. In operation, the disclosed imager employs a continuous line-by-line read of the image array 100, although other techniques such as an interleaved read technique are possible. Prior to being read, however, the disclosed imager resets each row a predetermined period of time—the integration time—before that row is read. As illustrated in FIG. 2, for example, a row 102a is reset approximately the same time a row 102b is read. Subsequent rows of the image array 100 are read until the row 102a is read an integration time period later. Thus, by adjusting how far "ahead" of a row read that row is reset, the disclosed imager adjusts the integration time.

A variety of other techniques are possible for adjusting integration time. Again the concept of integration time is simply the amount of time a particular pixel is allowed to accumulate light during a particular frame.

When the image array 100 is the CN0352 imager, each pixel consists of a photo-diode in which incoming photons are converted to electrons. During the integration time, a read transistor is switched off so that all photo generated electrons accumulate on the photo-diode's junction capacitance. The resulting sense node voltage is buffered by a second transistor that forms a source follower in combination with a current source, which is common to all pixels in each column. At the end of the integration time, the read transistor is enabled to transfer the buffered voltage to the column wire. A third transistor, the reset transistor, is then enabled to discharge the photo-signal, and the row is then read through a gain stage. The composite imager gain of the gain stage is set by a 3 bit GainControl[2:0] signal. The output of that variable gain amplifier then drives the on-chip analog to digital converter.

Each pixel includes two controls, a latch signal and a reset signal. When the reset signal goes low, the pixel starts storing charges on its junction until the latch signal goes high. At that instant, the photo voltage is transferred to variable gain amplifier and the column buffer via the composite source buffer. When the reset signal goes high to the pixel all the generated charge in the photo diode transfers through the low impedance node. In the disclosed imager, pixels are reset and latched on a row by row basis, so again as illustrated in FIG. 2, when the row 102a is reset, the row 102.b is being read. Then, an integration period of time later the row 102a is read. It will be appreciated that the integration time is a function of the frame rate and clock frequency at which the image array 100 is operated.

Matching Integration Time to Light Intensity Frequency

Figure 3A:
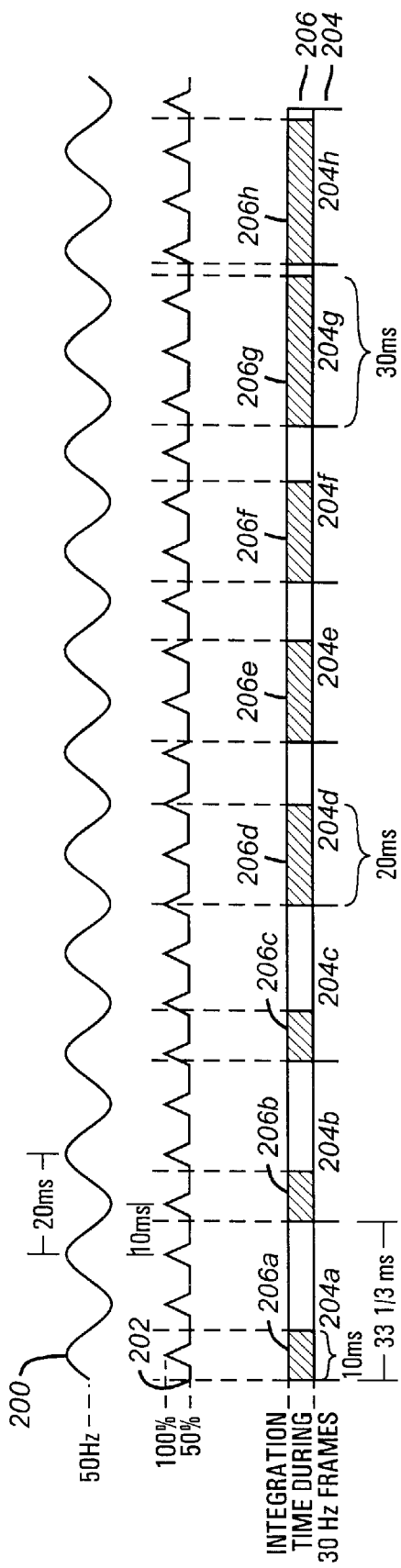
FIGS. 3A and 3B are timing diagrams illustrating how the implementation of integration time according to the invention "decouples" the light captured during integration from where within a particular lighting cycle the integration time begins.
Figure 3B:
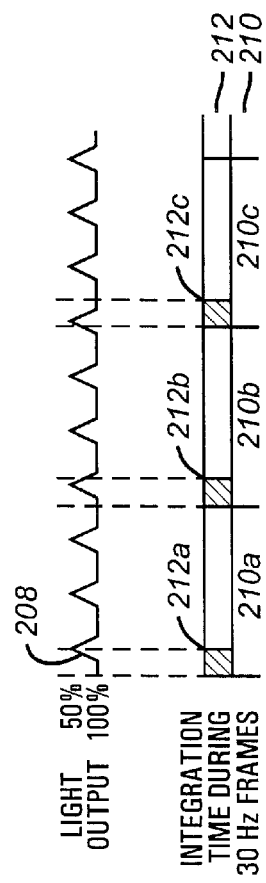

Turning to FIG. 3a, illustrated are the effects of implementing an integration time that is an integral multiple of the period of intensity of the lighting source; FIG. 3b illustrates a problem of implementing non-integral values of integration time. FIG. 3a illustrates a 50 Hz signal 200 used to drive a typical European fluorescent light, as well as an associated light output signal 202 of such a fluorescent light. The light output peaks during peak voltage, so the period of the peak intensity of light output is 10 milliseconds, or one-half of the 20 millisecond period of the 50 Hz signal 200. The intensity thus peaks at a rate of 100 Hz.

In conjunction with the 50 Hz signal 200 and the light output signal 202, shown are a sequence of frames 204 illustrating corresponding integration periods 206. Specifically, in a first three 33⅓ millisecond frames 204a, 204b and 204c, shown are 10 millisecond integration times 206a, 206b, and 206c. Assuming, for example, the integration time is the period of time in FIG. 2 from when the row 102b is reset until row 102b is read, at the end of the integration time, the row 102b will be read and reset for the following frame. Comparing the integration time 206a to the integration time 206c, it is seen that the peak intensity of the light output signal 202 occurs in the middle of the integration time 206a, but that during the integration time 206c portions of two separate peaks are captured. According to the invention, however, by setting the integration time to some multiple of the ten millisecond period of the light output 202, the amount of light captured during the integration time 206a is the same as the amount of light captured during the integration time 206c (assuming the image has not appreciably changed) because the system integrates a multiple of the period of the light output.

This is further illustrated for three subsequent frames 204d, 204e, and 204f, which employ 20 millisecond integration times 206d, 206e, and 206f. The integration period 206d has a peak of light output 202 falling in the middle of its period, and captures approximately half of two other peaks of light output 202. In comparison the integration period 206f fully captures two complete peaks of light output 202. But again, the amount of light captured is independent of where in the cycle of the light output 202 the integration begins.

Two succeeding frames 204g and 204h further illustrate this concept with 30 millisecond integration periods 206g and 206h, here capturing approximately three peaks of light output 202.

This should be contrasted to the integration periods illustrated in FIG. 3b. FIG. 3b shows a light output signal 208 which corresponds to the light output signal 202, but here, three frames 210 are illustrated with integration periods 212 that are not an integral multiple of the period of the peak intensity of light output 208. Instead, during three frames 210a, 210b, and 210c, approximately 5 millisecond integration periods 212a, 212b and 212c is illustrated. But while the integration period 212b captures nearly all of the peak of light output of the signal 208, the integration period 212a only captures half of that peak, thus illustrating that the amount of light captured is dependent on where the integration times begins and ends. Certain integration times can lead to a slow moving band of light on a resulting image.

Therefore, according to the invention, this flicker is reduced by providing an integration time, such as the integration time 206, that are a multiple of the period of the peak of light output 202.

Implementation of the Camera According to One Embodiment

Figure 4:
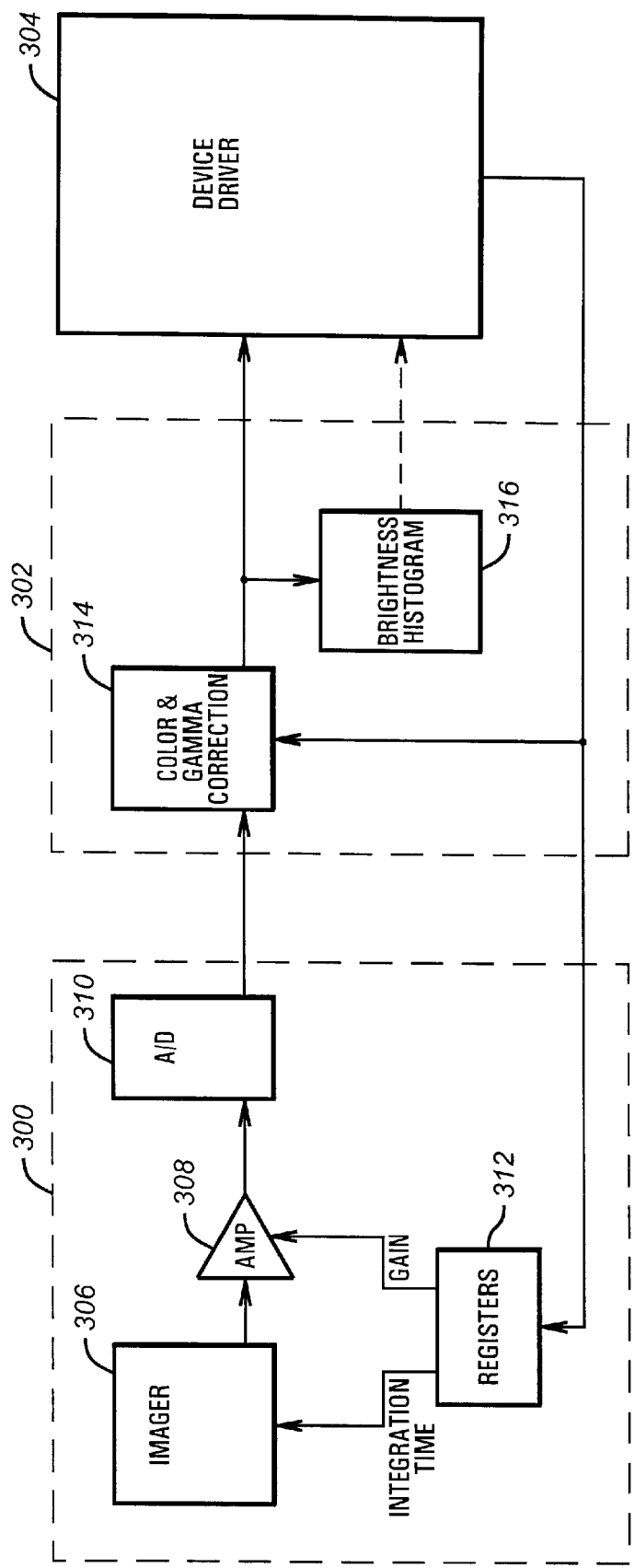
FIG. 4 is a block diagram of an imaging system implemented according to the invention to reduce lighting induced flicker.

Illustrated in FIG. 4 is a block diagram illustrating certain particularly useful components of a system implemented according to the invention. In FIG. 4, an imager chip 300 is provided in conjunction with an imager controller chip 302, all of which communicate with a device driver 304 that would, for example, be implemented in the computer system S. In the disclosed embodiment, the imager chip 300 is the CN0352 Digital CMOS Imager and the imager controller chip 302 is the CN0352p Pixel Processor and Control Chip. The device driver 304 operates on the computer system S, but could be implemented, for example, as part of the camera C, or as part of a standalone video camera.

In the diagram of FIG. 4 a number of components have been omitted for clarity. For example, the image controller 302 generally includes a variety of signal conditioning blocks such as a noise reduction block, a synchronization block, a defective pixel correction block, a geometric scaling block, an interpolation block, a color space converter block, an edge enhancement filter, a compression block, and a USB interface.

In the disclosed embodiment, an image array 306 which corresponds to the image array 100 of FIG. 1 captures lines of video information and provides an analog signal to an amplifier 308 having a variable gain. The amplifier 308 provides an amplified analog signal an analog-to-digital converter 310, which in the disclosed chip is a ten-bit analog to digital converter. Both the integration time of the imager 306 and the gain of the amplifier 308 are controlled by control circuitry accessed via registers 312. The registers 312 are controlled by the imager controller chip 302, which in turn receives a digitized image signal from the analog-to-digital converter 310. Two blocks are illustrated the imager controller chip 302, although as discussed above a variety of other blocks are implemented at intervening locations. In particular, a color and gamma correction block 314 ultimately receives the digitized image from the analog-to-digital converter 310, and a brightness histogram block 316 monitors the average brightness of the digital image output from the color and gamma correction block 314. In the disclosed embodiment, the brightness histogram block 316 actually monitors a center portion of the image and an edge portion of the image to provide two separate averages of intensity data.

The color and gamma correction block 314 then provides a corrected digital video image as output, and both that digital output and the data from the brightness histogram block 316 is ultimately received by the device driver 304 within the computer system S. Typically this data is transmitted in compressed form over a Universal Serial Bus (USB). One implementation is discussed, for example, in the USB Camera Designers Guide by Conexant Systems, Inc.

The device driver 304 is typically implemented to provide both variable brightness and automatic brightness control by adjusting portions of the imager chip 300 and the imager controller chip 302. In the disclosed embodiment, brightness is adjusted most coarsely by setting the integration time via the registers 312. Using a 30 Hz (or any other) frame rate with 50 Hz lighting, the integration times can be set to approximately 10 milliseconds, 20 milliseconds, or 30 milliseconds as illustrated in FIG. 3a. This provides three levels of intensity control, and preferably the device driver 304 sets the integration time to maximize the output of the image array 306 without oversaturating its pixels. The image from the image array 306 is then fed into the amplifier 308, which in the disclosed embodiment provides for eight levels of amplification. This provides a finer resolution enhancement of the original three levels set by the integration time. This data is then provided to the analog-to-digital converter 310 and can be further refined by changing the gamma tables of the color and gamma correction block 314. Thus, by using the three gain levels of integration time, the eight level of analog gain, and the multiple levels of digital gamma correction, a fine degree of brightness control can be achieved, all while maintaining the integration time at integral multiples of the period of the peak intensity of light output. The device driver 304 preferably monitors the data from the brightness histogram 316, and over time alters the overall system gain, providing automatic gain control for the entire system.

In a typical system, the user will set the system to define the lighting frequency, or may be asked to view an image display first showing an image run at one integration time setting and then at another to determine which is best. Instead, the system could detect the country in which it is operating based on system configuration data, or, in the case of a stand alone camera, a switch setting may provide for 50 Hz versus 60 Hz lighting. A stand alone camera could directly monitor the lighting. A variety of techniques are possible.

The device driver 304 can also be placed into a setup mode to monitor "beats" within the intensity of data as provided by the brightness histogram block 316. These beats can identify, for example, when the camera C is being implemented with 50 Hz lighting if the integration time is not set to a multiple of 10 milliseconds. For example, the integration time might be set to a multiple of $8\frac{1}{3}$ milliseconds, the appropriate time for 60 Hz lighting, but the system may be implemented in a 50 Hz lighting system. By detecting the beats, the device driver 304 can automatically adjust the integration time via the registers 312 to a multiple of 10 milliseconds. Alternatively, the computer system can detect whether is plugged into a 50 Hz or 60 Hz power supply, and provide that information to the device driver, which would then appropriately set the integration to a multiple of 10 milliseconds or a multiple of $8\frac{1}{3}$ milliseconds respectively.

Further, it should be understood that these techniques need not necessarily be implemented with the computer system S, but could be implemented in a standalone camera. In addition, the gain control of the device driver 304 could be implemented, for example, in a dedicated application specific integrated circuit as well in the device driver 304 of the general purpose computer systems. Similarly, although in the disclosed embodiment a particular combination of hardware and software is shown, the distribution of the various blocks among other combinations of hardware and software, or even hardware alone, is possible while implementing the features of the invention. A wide variety of configurations are available for implementing integration time set to an integral multiple of the period of peak light output. In addition, these techniques are not limited to CMOS imagers, but can be used with other types of digital imagers, for example CCD imagers, although the techniques for varying integration time may vary.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

We claim:

1. A method of reducing flicker caused by lighting having a periodic intensity using an imager having a pixel integration time, the method comprising the steps of:

setting the integration time to an integral multiple of the period of the periodic intensity of the lighting;

determining an amount to vary an overall system gain; and adjusting the overall system gain by adjusting the integration time while maintaining the integration time at an integral multiple of the period of the periodic intensity.

2. The method of claim 1 wherein the lighting is 50 Hz lighting and wherein the setting step further comprises the step of adjusting the integration to an integral multiple of 10 ms.

3. The method of claim 2, wherein the imager has a frame period and wherein the frame period is a non-integral multiple of the integration time.

4. The method of claim 3, wherein the frame period is 33⅓ ms.

5. The method of claim 1, wherein the lighting is 60 Hz lighting, and wherein the period of the periodic intensity of the lighting is 8⅓ ms.

6. The method of claim 1, further comprising the step of:

detecting the period of the periodic intensity.

7. The method of claim 6, wherein the detecting step further comprises:

detecting power line frequency; and determining the period of the periodic intensity to be ½ of the period of the power line frequency.

8. The method of claim 6, wherein the detecting step further comprises:

monitoring an output of the imager for beats of intensity; and determining the period of the periodic intensity based on the period of the beats and the integration time.

9. The method of claim 1, wherein the steps of determining and adjusting are performed by a software device driver in a general purpose computer.

10. The imager of claim 9, wherein the lighting is 50 Hz lighting and wherein the integration time adjustment block adjusts the integration time to an integral multiple of 10 ms.

11. The imager of claim 10, wherein the imager provides analog data at a frame period, and wherein the frame period is a non-integral multiple of the integration time.

12. The imager of claim 11, wherein the frame period is 33⅓ ms.

13. The imager of claim 9, wherein the lighting is 60 Hz lighting and wherein the integration time adjustment block adjusts the integration time to an integral multiple of 8⅓ ms.

14. An imager for a digital camera with reduced flicker caused by lighting having a periodic intensity, the imager providing data for a plurality of pixels, the imager comprising:

programmable integration time circuitry that controls an integration time of the plurality of pixels;

an integration time adjustment block coupled to the programmable integration time circuitry, the integration time adjustment block setting the integration time to an integral multiple of the period of the periodic intensity of the lighting; and an overall gain control block that adjusts an overall system gain by adjusting the integration time while maintaining the integration time at an integral multiple of the period of the periodic intensity.

15. The imager of claim 14, wherein the integration time adjustment block is within a software device driver in a general purpose computer.

16. The imager of claim 14, wherein the integration time adjustment block is in an application specific integrated circuit.

17. The imager of claim 14, further comprising:

an analog, variable gain stage receiving the data for the plurality of pixels and providing amplified analog pixel data;

an analog to digital converter receiving the amplified analog pixel data and providing digitized pixel data; and a gamma correction stage receiving the digitized pixel data, and providing scaled pixel data.

18. The imager of claim 17, the overall gain control block further adjusting the overall system gain by adjusting the variable gain stage and the gamma correction block.

19. The imager of claim 18 wherein the overall gain control block adjusts overall camera gain in response to average image intensity of the scaled pixel data.

20. The imager of claim 19, wherein the overall gain control block is implemented in a software device driver.

21. An imager providing data for a plurality of pixels for a digital camera with reduced flicker caused by lighting having a periodic intensity, the imager comprising:

means for controlling an integration time of the plurality of pixels to an integral multiple of the period of the periodic intensity of the lighting; and means for varying an overall system gain by adjusting the integration time while maintaining the integration time at an integral multiple of the period of the periodic intensity of the lighting.

22. The imager of claim 21, further comprising:

means for amplifying the data for the plurality of pixels, providing an amplified pixel data;

means for gamma-correcting the amplified pixel data, wherein the means for varying an overall system gain further varies the system gain by adjusting the means for amplifying the data for the plurality of pixels and by adjusting the means for gamma-correcting the amplified pixel data.

23. The imager of claim 21, the means for amplifying the data for the plurality of pixels comprising:

means for analog amplifying the data for the plurality of pixels, providing an amplified analog pixel data; and means for digitally converting the amplified analog pixel data into the amplified pixel data.

* * * * *